United States Patent [19]
Chen

[11] Patent Number: 5,677,080
[45] Date of Patent: Oct. 14, 1997

[54] BATTERY STRUCTURE WITH SINGLE-BODY INSERTING AND RECEIVING ELECTRODES

[75] Inventor: James Chin-Ming Chen, Tao-Yuan, China

[73] Assignee: Delta Green Energy, Inc., Hsinchu, Taiwan

[21] Appl. No.: 632,669

[22] Filed: Apr. 15, 1996

[51] Int. Cl.⁶ .................................................. H01M 2/02
[52] U.S. Cl. ...................... 429/167; 429/166; 429/208; 429/209
[58] Field of Search .................................. 429/209, 208, 429/166, 167

[56] References Cited

U.S. PATENT DOCUMENTS

| | | | |
|---|---|---|---|
| 3,627,586 | 12/1971 | Jammet | 429/166 X |
| 3,749,608 | 7/1973 | Sarbacher | 429/209 |

*Primary Examiner*—John S. Maples
*Attorney, Agent, or Firm*—Bo-In Lin

[57] ABSTRACT

The present invention discloses a battery which is contained in a casing having an electrolyte as a conductive medium. The battery includes a first electrode of a first electric polarity formed as a single-body inserting electrode. The battery further includes a second electrode of a second electric polarity formed as a single-receiving-body with a cavity to receive the first electrode therein. The battery further includes a insulation layer for insulating the first electrode from the second electrode. In one of the preferred embodiments, the first electrode is formed as an elongated cylinder and the second electrode is formed as an elongated hollow-cylindrical shell to receive the first electrode therein. In another embodiment, the first electrode is formed as an elongated star-shape-body and the second electrode is formed as an elongated-hollow-body having a star-shape-cavity corresponding to the star-shape-body to receive the first electrode therein. In a third embodiment, the first electrode is formed as a elongated cross-shape-body and the second electrode is formed as an elongated-hollow-body having a cross-shape-cavity corresponding to the cross-shape-body to receive the first electrode therein.

12 Claims, 12 Drawing Sheets

BATTERY STRUCTURE WITH SINGLE-BODY INSERTING AND RECEIVING ELECTRODES

BACKGROUND OF THE INVENTION

1. Field of the Invention

This invention relates generally to the battery structure and manufacture processes. More particularly, this invention relates to an improved battery structure with single-body inserting and receiving electrodes which can be manufactured with simplified and streamlined processing steps whereby these steps can be conveniently automated to produce batteries in large volume at lower cost.

2. Description of the Prior Art

Conventional battery manufacture processes are limited by the complicate procedures required to manufacture the batteries due to the structural complexity of the battery cells. Each cell includes positive and negative electrodes and each electrode is connected to a terminal for external connection. Additionally, each cell includes insulation layers for separating the positive and negative electrodes. Due to the structural complexity and complicate processes of manufacture, cost reduction for battery manufacture cannot be easily achieved. Furthermore, the manufacturing processes cannot be conveniently streamlined and automated. The ever increasing demand for low cost batteries with large volume production, especially in the consumer electronics market, are often not satisfied due to these limitations.

Hasebe et al. disclose in U.S. Pat. No. 5,053,292 entitled 'Nickel-Metal Hydride Secondary Cell' (Issued on Oct. 1, 1991) a nickel-metal hydride secondary cell, i.e., a rechargeable battery, with a standard structure as that shown in FIG. 1. This conventional rechargeable battery includes a non-sinter type nickel positive electrode 1 spaced, with insulation provided by a separator 3 made of synthetic resin non-woven material, away from a hydrogen absorbing alloy negative electrode 2. The positive electrode 1, separator 3, and negative electrode 2 are formed with plate-shape and arranged in spiral form to be accommodated within a cylindrical enclosure 4. In the upper opening of the enclosure 4, there is provided with a circular shaped closing plate 6 having an aperture 5 in the center thereof. An insulation gasket is also provided between the circumference of the closing plate 6 and the inner upper opening end of the enclosure 4. The closing plate 6 is tightly mounted to the enclosing 4 and sealed thereon with the gasket 7. A positive electrode lead 8 is coupled at one end to the positive electrode 1 and at the other end to the lower surface of the dosing plate 6. A positive electrode terminal 9, having a hat like shape is mounted onto the closing plate 6. The positive electrode lead 8 then made to be in contact with the positive electrode terminal 9 to provide a positive output voltage. For over-pressure protection, a rubber safety valve 10 is provided in a space defined by the dosing plate 6 and the positive electrode terminal 9 so that the aperture 5 is closed.

FIG. 2 shows another conventional battery cell which is similar in structure as that shown in FIG. 1. As also shown in the figure is a negative terminal, which generally is disposed at the bottom of a battery with negative electrode lead connected to the negative electrode plate and the terminal for providing a negative output voltage. Referring to FIG. 3A and 3B for conventional method of manufacture for forming the spiral-shaped positive and negative electrodes as shown above. FIG. 3A shows a positive electrode 20 before this plate shape electrode is wrapped around with the negative electrode 30 (FIG. 3B) together with the separator (not shown) for packing into a cylindrical container, i.e., the enclosure, in its final product shape as a marketable battery. The positive electrode 20 includes a positive terminal extension 25 which is formed as an elongated rectangular plate extending upwardly and the upward extending terminal extension 25 can either be formed by a process of soldering or cutting. In order to fabricate the plate-shaped electrodes, i.e., the positive and negative electrodes 20 and 30 respectively, metal sponge or plates formed with metal nets have to be first prepared as substrate to support the electrodes. FIGS. 3C and 3D are flow-chart diagrams for illustrating the processing steps of making a positive and negative electrodes respectively. Referring to FIG. 3C for the processing steps to make a positive electrode (step 31). The positive electrode materials are first prepared (step 32) which is then mixed with additives to form a paste (step 34). The paste is coated onto a positive electrode substrate (step 36). The coated substrate is thermally dried (step 38) and rolling pressed (step 40) to form the positive electrode plate. The positive electrode plate is cut into right size (step 42) with a terminal soldered onto the plate (step 44) to complete the processes for making the positive electrode(step 45).

Referring to FIG. 3D for the processing steps to make a negative electrode (step 50). The negative electrode materials, e.g., hydrogen storage alloys, are prepared (step 52) then melted and mixed with appropriate additives to form the negative electrode mixture (step 54). A hydride process is performed (step 56) followed by a sifting operation (step 58) to form the powder (step 60). The powders are then rolling pressed onto the negative electrode substrate (step 62). The substrate covered by the negative electrode mixture is cut into right size (step 64) followed by soldering operation to solder a terminal onto the electrode (step 66) to complete the processes of preparing a negative electrode (step 68). FIG. 3E shows the processing steps for manufacturing a battery by using the positive and negative electrode produced by the above processes. First, a plurality if insulating sheets are prepared (step 70). The positive and negative electrodes which are cut into pieces of right size are arranged together with the insulating sheets disposed between these electrode are arranged according to the size and shape of the battery container (step 75) as a battery core. The battery core is placed into the battery container (step 80) and the manufacture processes are completed by a sequence of standard battery canning processes (step 85) before the manufacturing steps of the battery is completed (step 90).

These processing steps involving thermal and mechanical operations. Precise control and monitoring of these processing steps, e.g., coating, baking, rolling press, hydride, sifting and cutting, have to be carefully performed to assure the quality of the electrodes. The processes of cutting the sheet electrodes are also wasteful due to the fact that the cutoff materials are not usable and must be discarded or have to be recycled. Wastes of material and energy cannot not be easily avoided in the conventional processes for battery manufacture. In addition, due to the nature of operation involved in these processing steps, automation of electrode and battery manufacture cannot be easily achieved. All these factors cause the increase in manufacture cost and limit the ability to produce high volume high quality electrodes and batteries in an automated fashion.

Therefore, a need still exists in the art of design and manufacture of electrode and batteries to provide a structural configuration for fabricating and packaging the positive and negative electrodes into a battery container which is simpler in structure, applying processing steps which are precisely controllable to assure reliable high quality electrodes are produced, easier for streamlining the manufacture processes to reduce the time and cost of manufacture such that large volume of high quality batteries can be produced in a highly automated fashion.

SUMMARY OF THE PRESENT INVENTION

It is therefore an object of the present invention to provide a new structural configuration and manufacture method for making the positive and negative electrodes and for packaging the electrodes into a battery container which would enable those of ordinary skill in the art to overcome the aforementioned difficulties and limitations encountered in the prior art.

Specifically, it is an object of the present invention to provide a new structural configuration and manufacture method for making the positive and negative electrodes as single-body inserting and receiving electrodes for packaging the positive and negative electrodes into a battery container which simplify the structure of the electrodes and packaging thus reducing the time and cost of battery manufacture.

Another object of the present invention is to provide a new structural configuration and manufacture method for making the positive and negative electrodes such that the processing steps for manufacturing the electrodes can be conveniently monitored and controlled thus improving the reliability and performance of the electrodes and the batteries.

Another object of the present invention is to provide a structural configuration and manufacture method for making the positive and negative electrodes and for packaging the electrodes into a battery container wherein these steps can be conveniently streamlined and automated such that large volumes of high quality batteries can be mass-produced at lower cost.

Briefly, in a preferred embodiment, the present invention includes a battery contained in a casing having an electrolyte as a conductive medium. The battery includes a first electrode of a first electric polarity formed as a single-body inserting electrode. The battery further includes a second electrode of a second electric polarity formed as a single-receiving-body with a cavity to receive the first electrode therein. The battery further includes a insulation means for insulating the first electrode from the second electrode. In one of the preferred embodiments, the first electrode is formed as an elongated cylinder and the second electrode is formed as an elongated hollow-cylindrical shell to receive the first electrode therein. In a different embodiment, the first electrode is formed as an elongated star-shape-body and the second electrode is formed as an elongated-hollow-body having a star-shape-cavity corresponding to the star-shape-body to receive the first electrode therein. In a different embodiment, the first electrode is formed as a elongated cross-shape-body and the second electrode is formed as an elongated-hollow-body having a cross-shape-cavity corresponding to the cross-shape-body to receive the first electrode therein.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 4B:
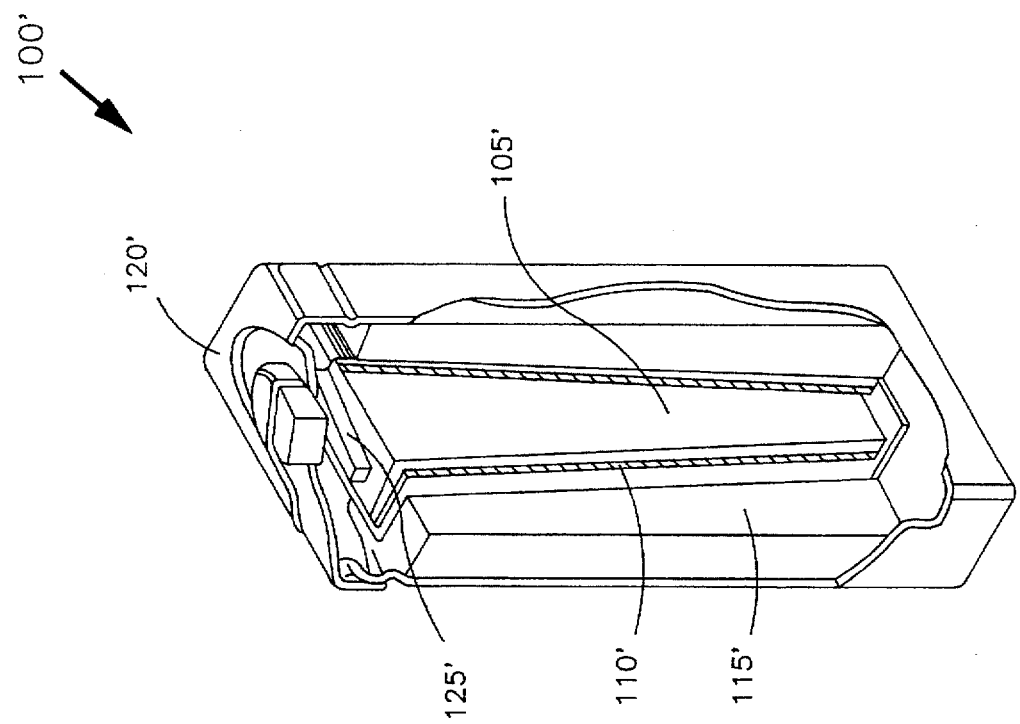
FIGS. 4A and 4B are a partial perspective views of a first electrode for inserting and packaging into a second receiving electrode for manufacturing a cylindrical and rectangular batteries of the present invention respectively.
Figure 4A:
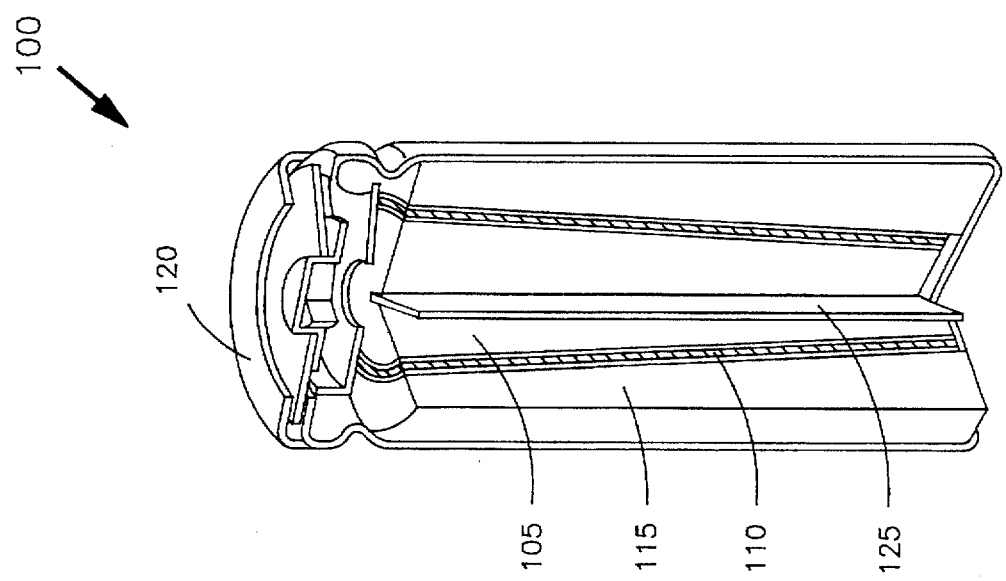

FIG. 4 shows a battery 100 of the present invention. The battery 100 includes a first electrode, e.g., a positive electrode 105, which is formed as an elongated cylinder. The positive electrode 105 is insulated by an insulating layer 110 from a second electrode 115, e.g., a negative electrode. The negative electrode 110 is formed as a cylindrical shell having a cylindrical cavity to receive the positive electrode 105 into the cavity. The negative electrode 115 is in contact and wrapped around by a battery container 120. The battery container 120 is applied as a negative or ground terminal. The positive electrode 105 further includes a core contact 125 which is a conductive core for contacting with a positive terminal 130 formed on top of the battery 100. The core contact 125 may be formed with a star shape which has an advantage to strengthen the structure of the positive electrode. The star shaped core contact 125 also increases the electrode contact area such that the discharging current can be increased to generate higher instant battery power. The core contact 125 is preferably composed of nickel.

In this preferred embodiment, the positive electrode is formed as an elongated cylinder having a larger upper-end and a smaller lower-end. Corresponding to the shape of the positive electrode 105, the negative electrode 110 is formed with a cylindrical cavity which has a larger upper-opening and a smaller lower-opening. The smaller lower-end of the positive electrode 105 is employed as an inserting end to insert into the cavity of the negative electrode 115 from the larger upper-opening. The shapes of the positive electrode 105 and the corresponding shape of the cavity of the negative electrode simplify the manufacturing process because the relative size difference of the inserting end of the positive electrode 105 to the larger upper-opening of the negative electrode 115 make it more convenient to insert the positive electrode 105 into the cavity of the negative electrode 110. This relative shape and size differences of the positive and negative electrodes simplify the automation process. FIG. 4B is a partial perspective view of another battery 100' of similar structure as battery 100 except that battery 100' is manufactured as a rectangular battery with a rectangular inserting electrode 105' as a positive electrode and a corresponding negative electrode 115' with a rectangular shell having a cavity to receive the positive electrode 105'. Similar to battery 100, the inserting end of the positive electrode 105' is also made smaller and the upper-opening, i.e., the receiving opening, of the negative electrode 115' is also made larger to simplify the automation process.

Therefore, the present invention discloses a battery 100 contained in a casing 120 having an electrolyte as a conductive medium, the battery 100 includes a first electrode 105 of a first electric polarity having a single-body structure. The battery 100 further includes a second electrode 115 of a second electric polarity having a single-hollow-body with a cavity to receive the first electrode 105 therein. The battery further includes an insulation means 110 for insulating the first electrode 105 from the second electrode 115. In a preferred embodiment, the first electrode 105 is formed as an elongated cylinder, and the second electrode 215 is formed as an elongated-hollow-body having a cylindrical-cavity corresponding to the cylinder as the first electrode 105 to receive the first electrode 105 therein.

Figure 5:
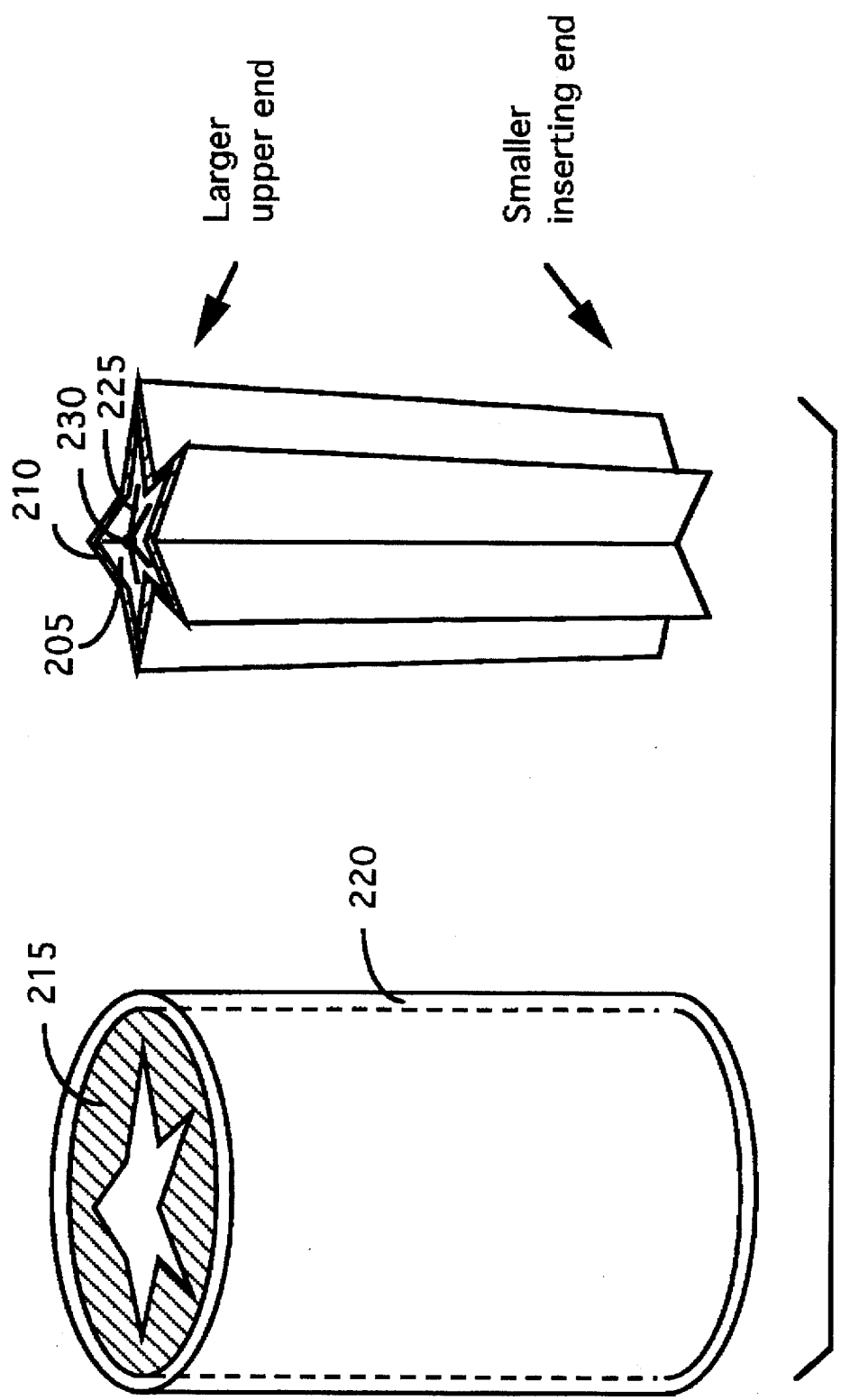
FIG. 5 is a partial perspective view of a first electrode for inserting and packaging into a second receiving electrode for manufacturing another battery of the present invention.
Figure 5A:
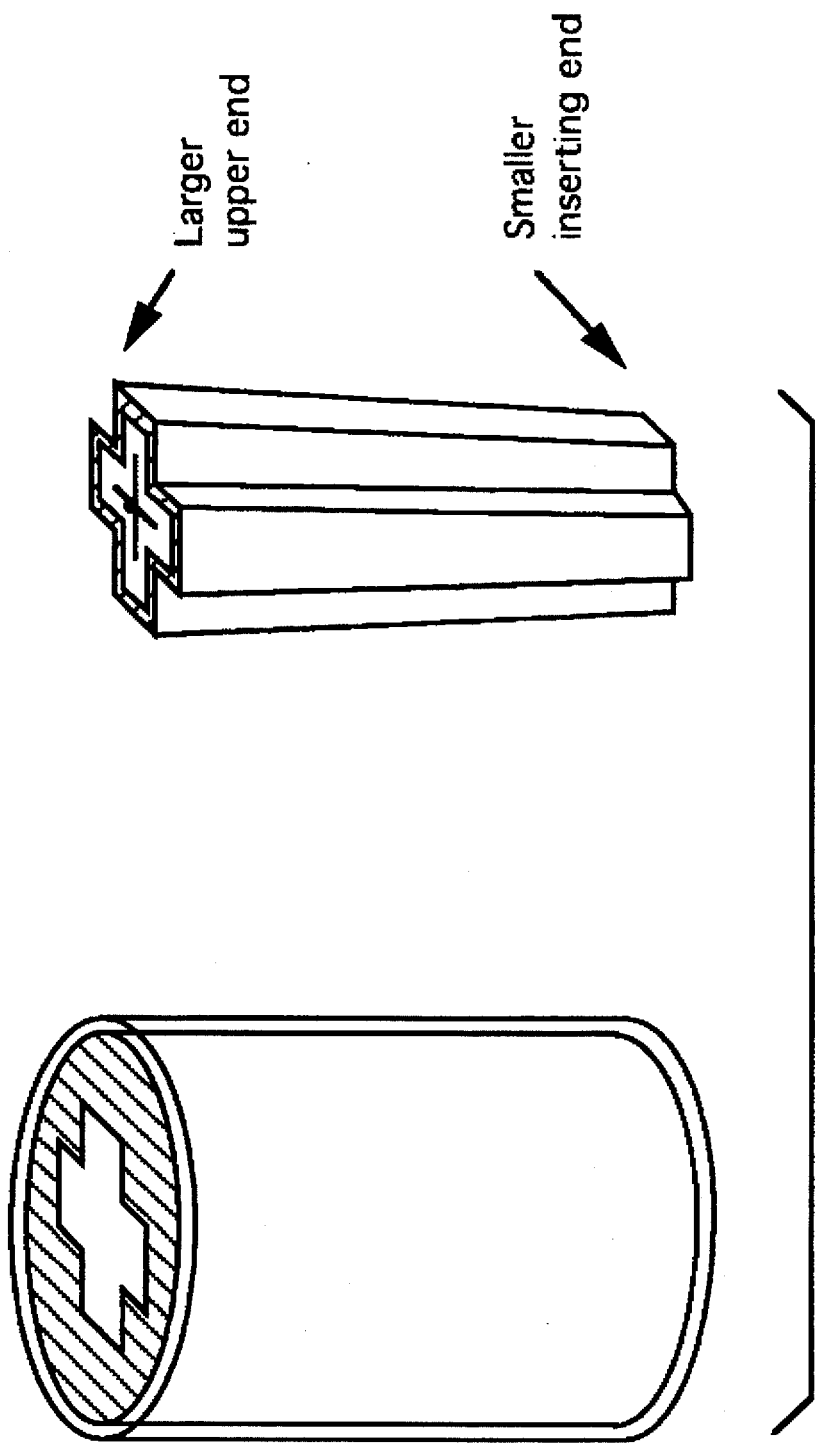
FIG. 5A is a partial perspective view of a cross-shaped first electrode for inserting and packaging into a second receiving electrode.

FIG. 5 shows another battery 200 of the present invention which includes a first electrode, i.e., a star-shaped inserting electrode 205. The first electrode 205 is wrapped around by an insulating layer 210 thus insulated from a second electrode, i.e., a receiving electrode 215. The receiving electrode 215 has a star-shaped cavity which is configured to correspond to the star-shaped inserting electrode 205 to receive the first electrode 205 into the cavity. The negative electrode 215 is in contact and wrapped around by a battery container 220. The battery container 220 is applied as a negative or ground terminal. The positive electrode 205 further includes a core contact 225 which is a conductive core for contacting with a positive terminal 230 formed on top of the battery 200. The core contact 225 may be formed with a star shape also similar to the star-shape as the electrode which has an advantage to strengthen the structure of the positive electrode. The star-shaped inserting electrode 205 and the receiving electrode 215 with a receiving cavity corresponding to the star-shape electrode 205, has a further advantage that greater contact areas are provided of the positive and negative electrodes with the electrolyte such that greater discharging current can be generated to produce a higher power. In a preferred embodiment, the star-shaped electrode 205 has a smaller inserting end and the star-shaped cavity of the negative electrode 215 has a large receiving opening to receive the inserting end. The purpose is to simplify a manufacture step of inserting the positive electrode 205 with a smaller inserting end into the negative electrode 215 with a larger receiving opening such that the inserting step can be more conveniently automated because of the size difference.

In summary, this invention further discloses a battery 200 contained in a casing 220 having an electrolyte as a conductive medium. The battery 200 includes a first electrode 205 of a first electric polarity having a single-body and formed as an elongated star-shape-body. The battery 200 further includes a second electrode 215 of a second electric polarity having a single-hollow-body with a cavity which has a star-shape-cavity corresponding to the star-shape-body of the first electrode to receive the first electrode therein. The battery 200 further has an insulation means for insulating the first electrode from the second electrode. In a preferred embodiment, the first electrode 205 is a positive electrode and the second electrode 215 is a negative electrode.

Figure 6A:
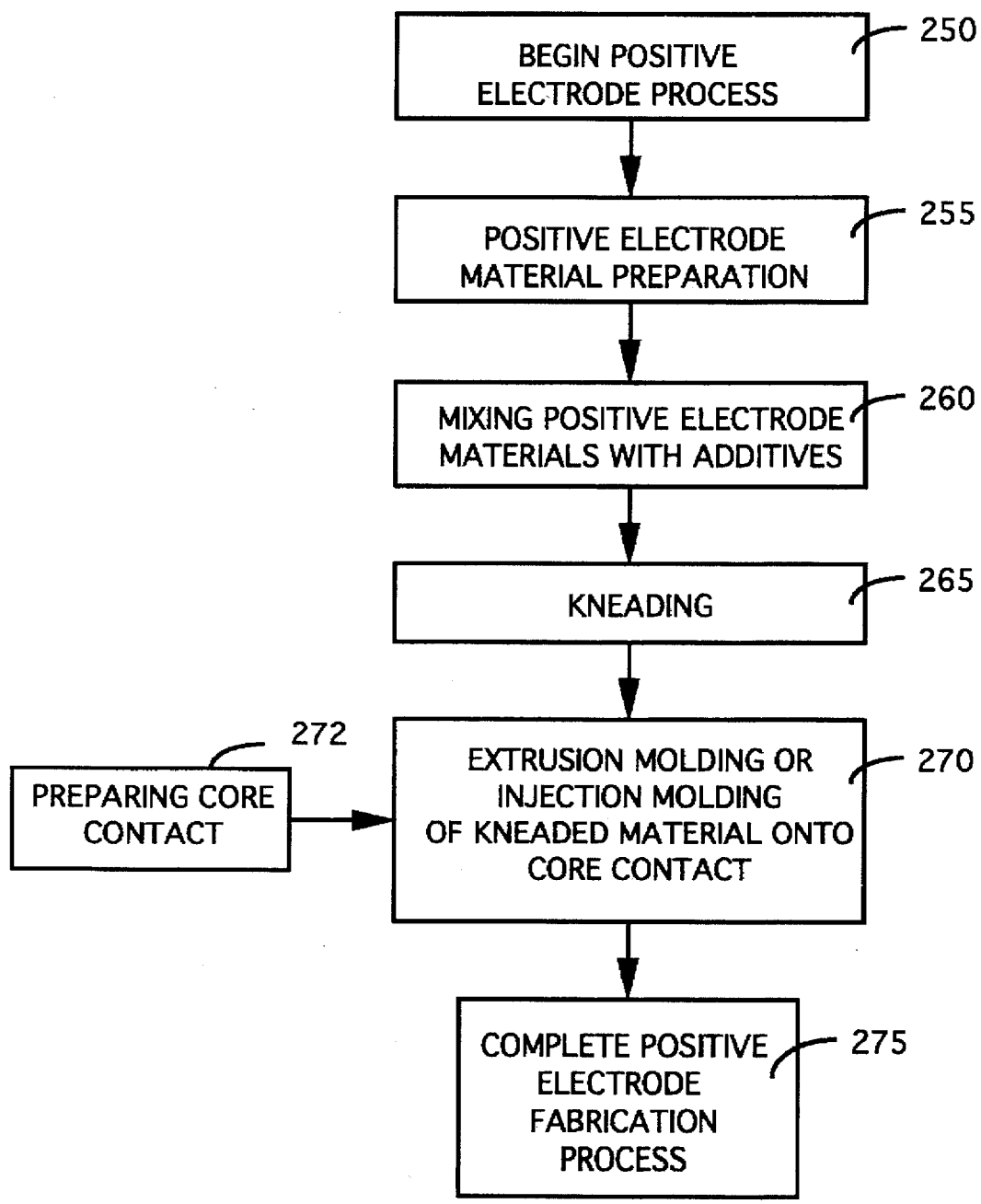
FIGS. 6A to 6C are flow charts showing the processing steps employed for manufacturing the positive electrode, the negative electrode and the battery respectively.
Figure 6B:
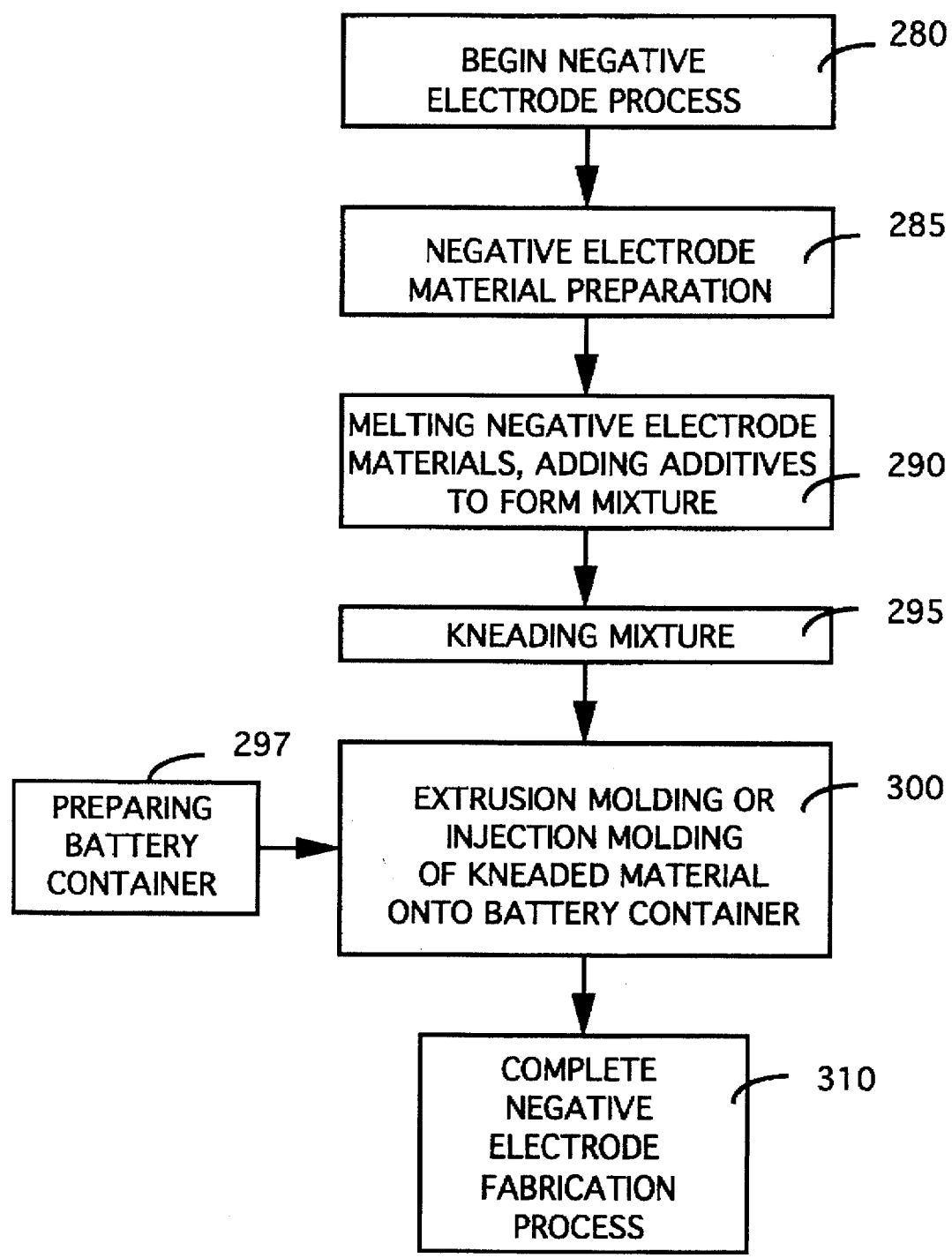
Figure 6C:
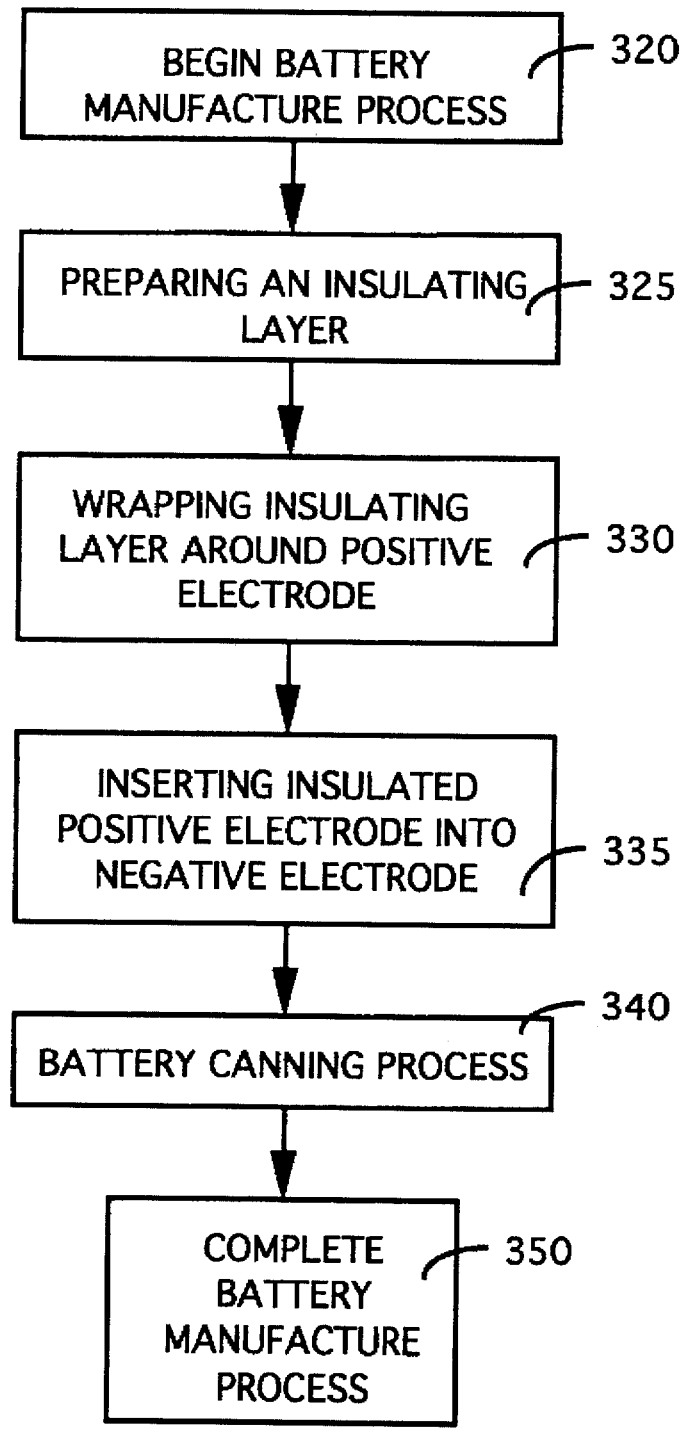

Please refer to FIGS. 6A, 6B and 6C for the processing steps for fabricating the positive electrode 205, the negative electrodes 215, and the battery 200 respectively. Referring to FIG. 6A for the processing steps to make a positive electrode (step 250). The positive electrode materials are first prepared (step 255) which is then mixed with additives to form a powder mixture (step 260). The powder mixture is kneaded by the use of a kneading machine (step 265). A core contact, i.e., the core contact 225 is prepared (step 272). An extrusion molding or injection molding is then performed by use of the kneaded material onto the contact core 225 (step 270) to complete the fabrication processes of the positive electrode (step 275).

Referring to FIG. 6B for the processing steps to make a negative electrode (step 280). The negative electrode materials, e.g., hydrogen storage alloys, are prepared (step 285) then melted and mixed with appropriate additives to form the negative electrode mixture (step 290). The mixture is kneaded by the use of a kneading machine (step 295). A battery container, i.e., the battery container 220 is prepared (step 297). An extrusion molding or injection molding is then performed by use of the kneaded material onto the battery conger 220 (step 300) with a cavity to receive the positive electrode to complete the fabrication processes of the negative electrode (step 310).

Figure 1:
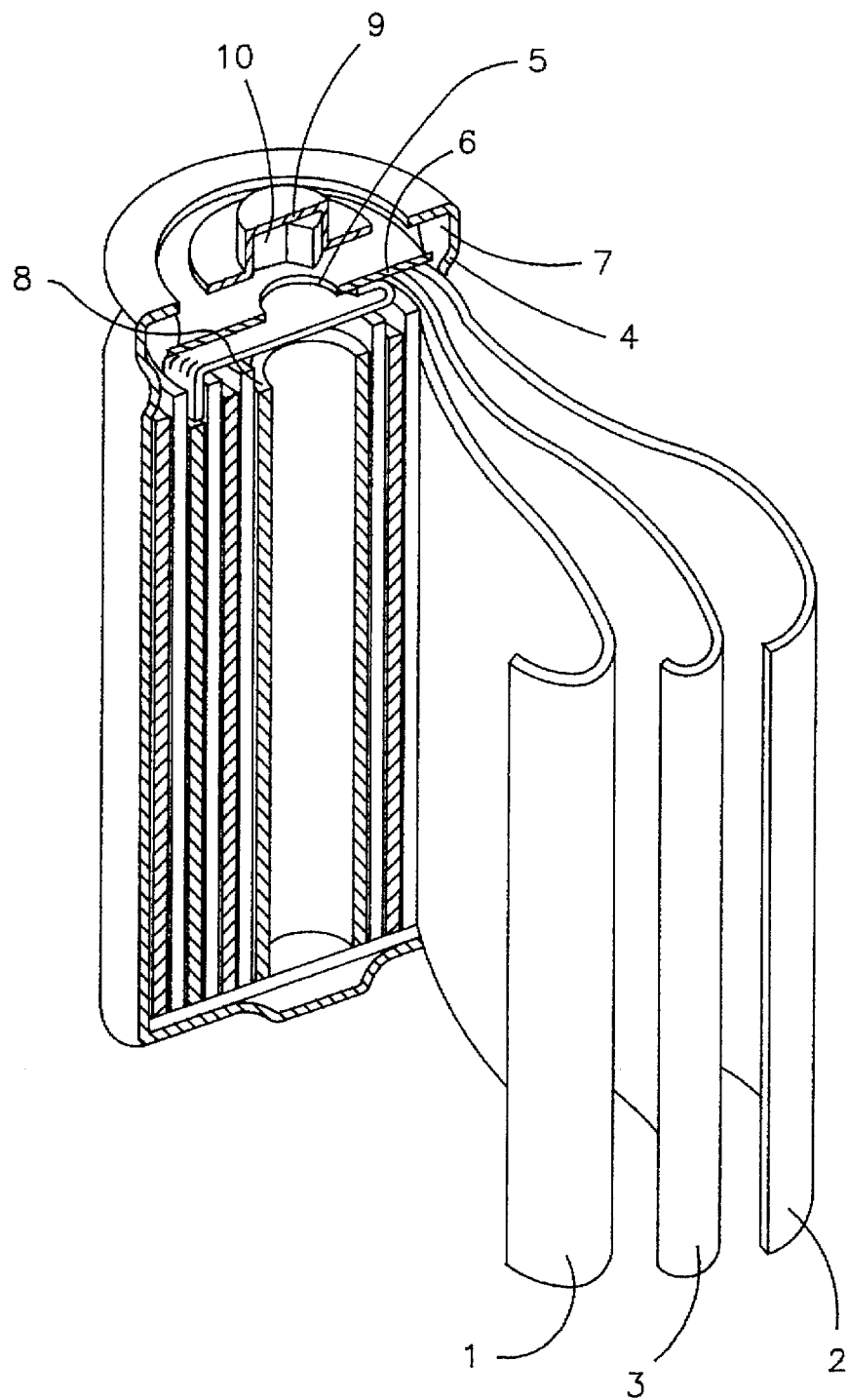
FIG. 1 partial perspective view showing the structure of positive and negative electrodes and connection terminals to be packaged into a battery cell employed in the prior art.
Figure 2:
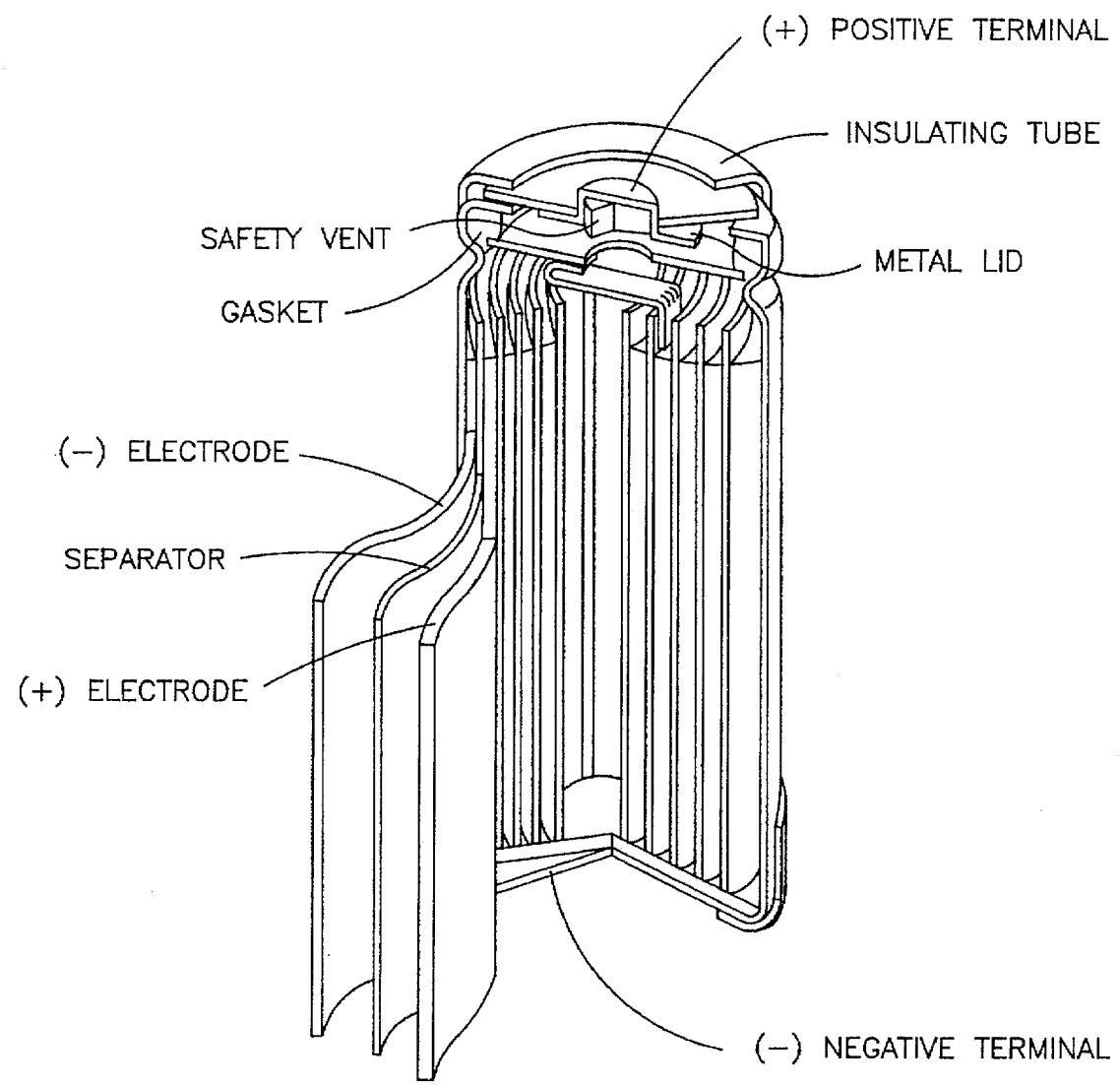
FIG. 2 is another partial perspective view showing the structure of positive and negative electrodes and connection terminals to be packaged into a battery cell employed in another prior art battery.
Figure 3A:
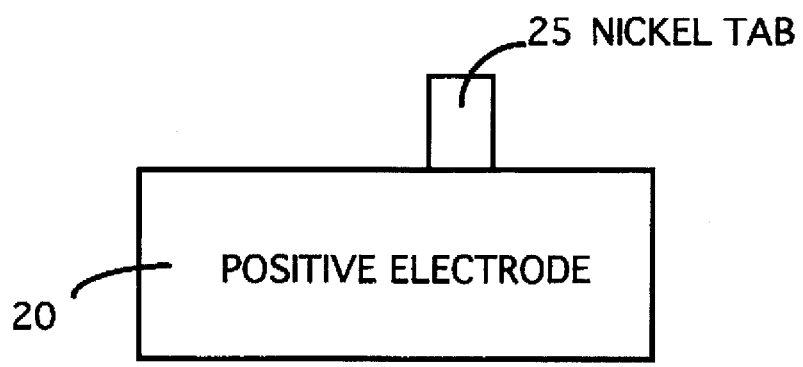
FIGS. 3A and 3B are side cross sectional views of a positive and negative electrode respectively for packaging into a conventional battery.
Figure 3B:
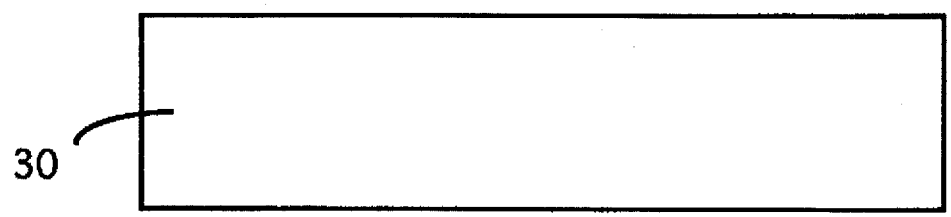
Figure 3C:
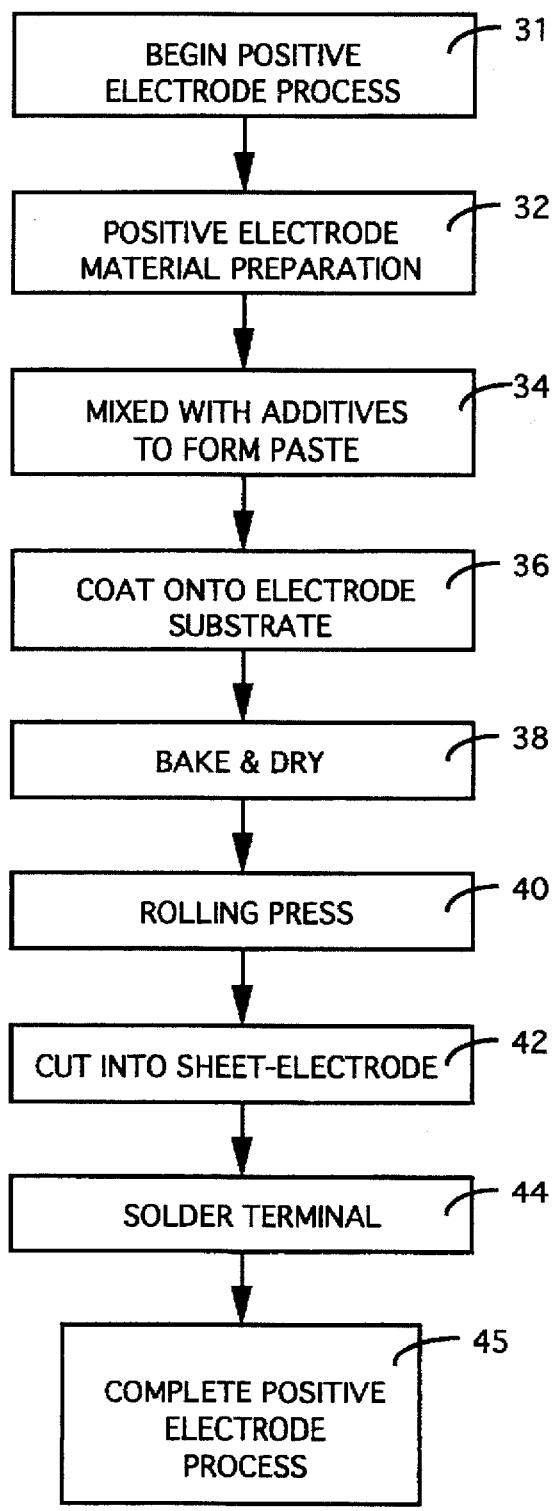
FIGS. 3C, 3D, and 3E are flow charts showing the processing steps employed to manufacture the positive electrode, the negative electrode, and the battery respectively.
Figure 3D:
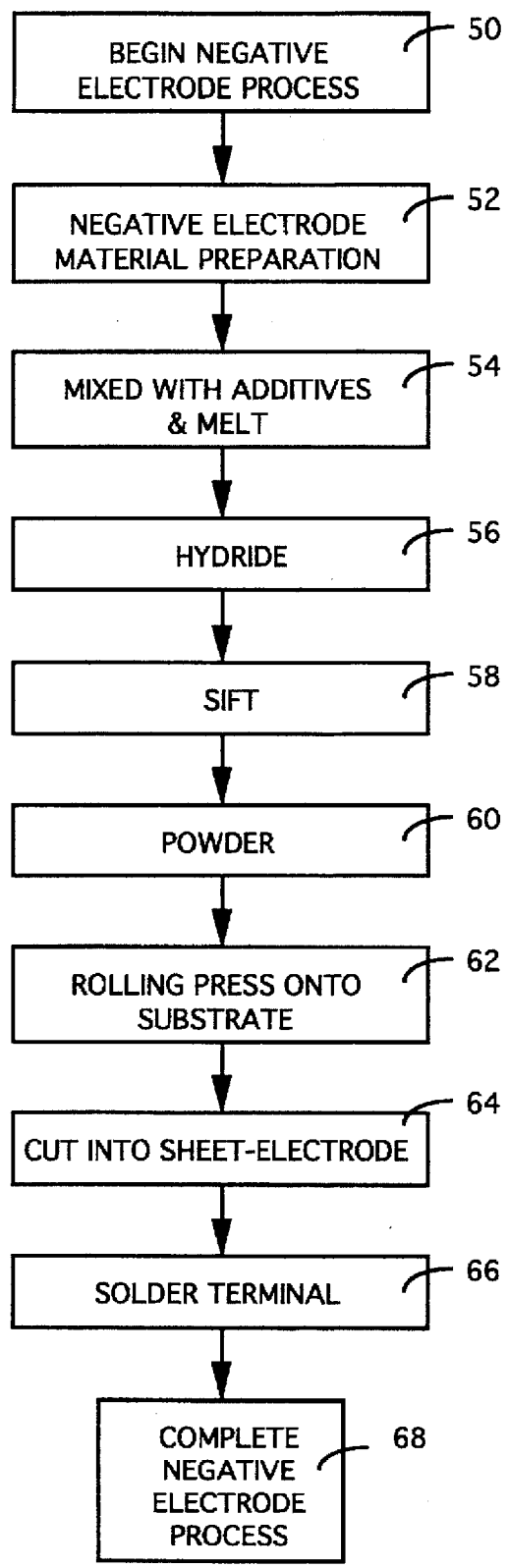
Figure 3E:
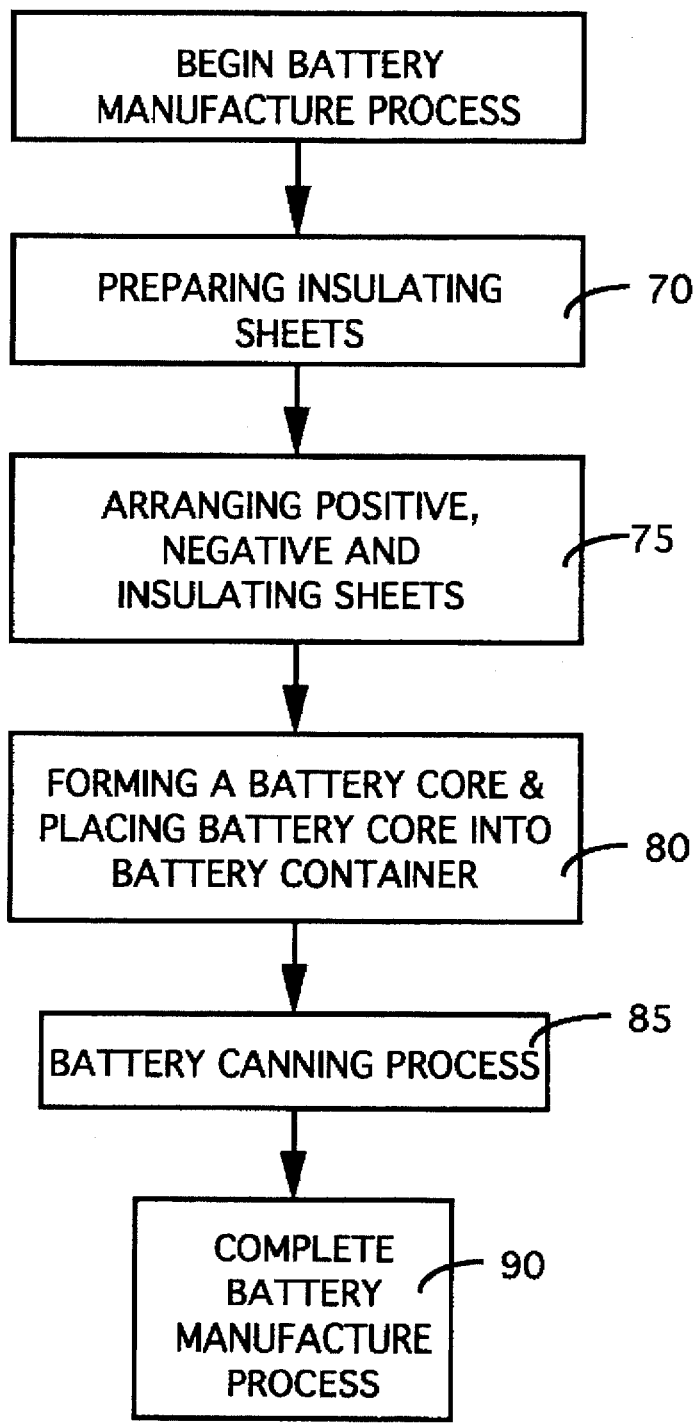

Please refer to FIG. 6C for the processing steps to manufacture the battery 200. The process begins (step 320) by preparing an insulating layer (step 325) and wrapping the insulating layer 210 around the positive electrode 205 (step 330) to form an insulated inserting electrode. The insulated inserting electrode is then inserted into the battery container 220 containing a receiving negative electrode 215 (step 335). After the positive electrode 205 and the negative electrode 215 with the insulating layer 210 now inserted into the battery container 220, the remaining processing steps for fabricating the battery 200 are identically the same with a sequence of standard battery canning processes (step 340) as that employed by the manufacturing processes of a conventional battery, i.e., steps 85 and 90 as that of FIG. 3E. Since these steps are only indirectly related to the techniques disclosed by this invention, the battery canning processes, which are generally a set of standard procedures in the battery industry, are not described in more details.

This invention also discloses a method for manufacturing a battery contained in a casing having an electrolyte as a conductive medium. The method includes the steps of: (a) fabricating a first electrode 205 of a first electric polarity having a single-body; (b) fabricating a second electrode 215 of a second electric polarity having a single-hollow-body with a cavity to receive the first electrode therein; and (c) wrapping an insulation means 210 around the first electrode and inserting the first electrode 205 into the cavity of the second electrode 215.

Therefore, the present invention provides a new structural configuration and manufacture method for fabricating the positive and negative electrodes and for packaging these electrodes into a battery container which would enable those of ordinary skill in the art to overcome the difficulties and limitations encountered in the prior art. Specifically, the present invention provides a new manufacture method for making the positive and negative electrodes as single-body inserting and receiving electrodes for packaging the positive and negative electrodes into a battery container which simplify the structure of the electrodes and packaging thus reducing the time and cost of battery manufacture. In this new manufacture method, the processing steps for manufacturing the electrodes can be conveniently monitored and controlled thus improving the reliability and performance of the electrodes and the batteries. Furthermore, the processing steps can be conveniently streamlined and automated such that large volumes of high quality batteries can be mass-produced at lower cost.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A battery contained in a casing having an electrolyte as a conductive medium, said battery comprising:

a first electrode of a first electric polarity having a single-body;

a second electrode of a second electric polarity having a single-hollow-body with a cavity to receive said first electrode therein;

an insulation means for insulating said first electrode from said second electrode; and said first electrode further includes a star-shaped core contact composed of a conducting material for making contact with an electrical terminal of said battery.

2. The battery of claim 1 wherein:

said first electrode is formed as an elongated cylinder; and said second electrode is formed as an elongated hollow-cylindrical shell to receive said first electrode therein.

3. The battery of claim 1 wherein:

said first electrode having an inserting end and said second electrode having a receiving opening for receiving said inserting end wherein said receiving opening is larger than said inserting end whereby said first electrode can be more conveniently received by said second electrode.

4. A battery contained in a casing having an electrolyte as a conductive medium, said battery comprising:

a first electrode of a first electric polarity having a single-body formed as an elongated star-shape-body;

a second electrode of a second electric polarity having an elongated-hollow-body with a star-shape-cavity corresponding to said star-shape-body to receive said first electrode therein; and an insulation means for insulating said first electrode from said second electrode.

5. A battery of claim 4 wherein:

said first electrode is a positive electrode and said second electrode is a negative electrode.

6. The battery of claim 4 wherein:

said first electrode having an inserting end and said second electrode having a receiving opening for receiving said inserting end wherein said receiving opening is larger than said inserting end whereby said first electrode can be more conveniently received by said second electrode.

7. A battery contained in a casing having an electrolyte as a conductive medium, said battery comprising:

a first electrode of a first electric polarity having a single-body formed as an elongated cross-shape-body;

a second electrode of a second electric polarity having an elongated-hollow-body with a cross-shape-cavity corresponding to said cross-shape-body to receive said first electrode therein; and an insulation means for insulating said first electrode from said second electrode.

8. The battery of claim 7 wherein:

said first electrode having an inserting end and said second electrode having an receiving opening for receiving said inserting end wherein said receiving opening is larger than said inserting end whereby said first electrode can be more conveniently received by said second electrode.

9. The battery of claim 7 wherein:

said first electrode further includes a star-shaped core contact composed of a conducting material for making contact with an electrical terminal of said battery.

10. A battery contained in a casing having an electrolyte as a conductive medium, said battery comprising:

a positive electrode having an elongated star-shape-body wherein said positive electrode further includes a star-shaped core contact composed of a conducting material for making contact with an electrical terminal of said battery;

a negative electrode having a star-shape-cavity corresponding to said elongated star-shape-body to receive said positive electrode therein;

said positive electrode having an inserting end and said negative electrode having a receiving opening for receiving said inserting end wherein said receiving opening is larger than said inserting end whereby said positive electrode can be conveniently received by said negative electrode; and an insulation means for insulating said positive electrode from said negative electrode.

11. A battery contained in a casing having an electrolyte as a conductive medium, said battery comprising:

a positive electrode having an elongated cylinder wherein said positive electrode further includes a star-shaped core contact composed of a conducting material for making contact with an electrical terminal of said battery;

a negative electrode having a cylindrical-cavity corresponding to said elongated cylinder to receive said positive electrode therein;

said positive electrode having an inserting end and said negative electrode having a receiving opening for receiving said inserting end wherein said receiving opening is larger than said inserting end whereby said positive electrode can be conveniently received by said negative electrode; and an insulation means for insulating said positive electrode from said negative electrode.

12. A battery contained in a casing having an electrolyte as a conductive medium, said battery comprising:

a positive electrode having elongated cross-shape-body wherein said positive electrode further includes a cross-shaped core contact composed of a conducting material for making contact with an electrical terminal of said battery;

a negative electrode having a cross-shaped-cavity corresponding to said elongated cross-shaped-body to receive said positive electrode therein;

said positive electrode having an inserting end and said negative electrode having a receiving opening for receiving said inserting end wherein said receiving opening is larger than said inserting end whereby said positive electrode can be conveniently received by said negative electrode; and an insulation means for insulating said positive electrode from said negative electrode.

* * * * *